United States Patent [19]

Samuels et al.

[11] Patent Number: 5,422,384
[45] Date of Patent: Jun. 6, 1995

[54] GLASS/POLYMER COMPOSITES AND METHODS OF MAKING

[75] Inventors: W. D. Samuels; Gregory J. Exarhos, Richland, both of Wash.

[73] Assignee: Battelle Memorial Institute, Richland, Wash.

[21] Appl. No.: 981,700

[22] Filed: Nov. 25, 1992

[51] Int. Cl.$^6$ .............................................. C08K 3/32
[52] U.S. Cl. ..................................... 523/170; 524/414; 524/423; 524/429; 524/556; 524/560; 524/561; 524/568; 524/567; 524/588; 524/610
[58] Field of Search ............... 524/414, 423, 429, 556, 524/560, 561, 567, 568, 588, 610

[56] References Cited

U.S. PATENT DOCUMENTS 3,085,488  4/1963  Hull .................................. 524/414
5,010,128  4/1991  Coltrain ............................ 524/405

FOREIGN PATENT DOCUMENTS 50-40505  4/1975  Japan .

Primary Examiner—Ralph H. Dean
Attorney, Agent, or Firm—Paul W. Zimmerman

[57] ABSTRACT

The present invention relates to new glass/polymer composites and methods for making them. More specifically, the invention is glass/polymer composites having phases that are at the molecular level and thereby practicably indistinguishable. The invention further discloses making molecular phase glass/polymer composites by mixing a glass and a polymer in a compatible solvent.

14 Claims, No Drawings

GLASS/POLYMER COMPOSITES AND METHODS OF MAKING

This invention was made with Government support under Contract DE-AC06-76RLO 1830 awarded by the U.S. Department of Energy. The Government has certain rights in the invention.

FIELD OF THE INVENTION

The present invention relates generally to new glass/polymer composites and methods for making them. More specifically, the invention relates to glass/polymer composites wherein the interfacing between material constituents or phases is at the molecular level, thereby making the material constituents or phases practicably indistinguishable. The invention further relates to making molecular phase glass/polymer composites by dissolving and mixing glass and polymers in a compatible solvent.

BACKGROUND OF THE INVENTION

Polymer/glass or polymer/ceramic composites are known to exhibit superior characteristics compared to non-composite polymer or glass, or ceramic materials taken individually. Improved characteristics include but are not limited to increased thermal stability, chemical stability, and enhanced fracture toughness. This combination of characteristics has made polymer/glass composite materials suitable for uses including but not limited to use as fire retardants. Other uses include but are not limited to lightweight structural applications; for example, optical windows and protective coatings.

The polymer/glass composites are made in two forms. The first form is a glass-phase dispersed material within a polymer carrier matrix material phase as shown by W. A. Bahn and C. J. Quinn, MICROSTRUCTURES OF LOW MELTING TEMPERATURE GLASS/POLYARYLETHERKETONE BLENDS, Preprints, Apr. 5–9, 1991, ANTEC'91, 2730, and the second form is a polymer-phase dispersed material intercalated throughout a glass carrier matrix material phase as demonstrated by E. J. A. Pope et al., TRANSPARENT SILICA GEL-PMMA COMPOSITES, *J. Mat. Res. Soc.*, 1989 4(4), 1018. In either form, the microstructure of either or both phases persists as the phases are mixed. In other words, there exist discernible bulk phases or islands of dispersed material within the carrier matrix material of the composite.

Either form of these bulk phase polymer/glass composites is made by thermomechanical bulk mixing or diffusion processes. Generally, one or both bulk phase composite constituents are heated and softened, or melted at temperatures ranging from about 380° C. to about 430° C., then mechanically mixed and kneaded at the elevated temperature as taught, for example, by W. A. Bahn et al. Alternatively, a polymer solution may be passed through a porous glass/ceramic matrix leaving the polymer entrained on the pore surfaces as demonstrated by E. J. A. Pope et al.

While bulk phase polymer/glass composites prepared in these ways exhibit the improved properties discussed above, it is believed that the molecular phase glass/polymer composites of the present invention exhibit further improvement in these properties. Moreover, it is expected that the composite material of the present invention will extend performance limits of glass/polymer composites.

The method of making the molecular phase glass/polymer composites requires lower temperatures than the methods for mechanical mixing of bulk phase glass/polymer composites.

SUMMARY OF THE INVENTION

The invention is molecular phase polymer/glass composite materials wherein the phases of carrier matrix material and dispersed material are at the molecular level and thereby practicably indistinguishable. The invention includes methods of making these molecular phase polymer/glass composites.

The method of making these molecular phase polymer/glass composite materials has four basic steps. The first step involves selecting compatible solvents and solutes. The second step is mixing a solution of a glass with a polymer and forming a mixture that is homogeneous at the molecular level. The third step involves removing the solvent while retaining the homogeneous molecular mixture. The fourth step is heating the homogeneous molecular mixture and forming bonds at the molecular level between the glass and the polymer.

In addition to the improved mechanical properties of these molecular phase glass/polymer composites, less energy (both thermal and mechanical) is required for their preparation. Moreover, because solutions are mixed at room temperature, and because the mixture is an intimate mixture, products can be made in a number of ways including but not limited to dip coating, spin casting, melting, casting, and extruding. Products include but are not limited to bulk material products, coatings, films, sheets, and fibers. Further advantages include the use of inexpensive and readily available starting materials or feedstocks and applicability to a wide range of composite compositions.

The subject matter of the present invention is particularly pointed out and distinctly claimed in the concluding portion of this specification. However, both the organization and method of operation, together with further advantages and objects thereof, may best be understood by reference to the following description.

DESCRIPTION OF THE PREFERRED EMBODIMENT(S)

According to a first aspect of the invention, a glass/polymer composite material is made that is a solid solution or molecular phase glass/polymer composite. This solid solution is distinct from a solid mixture because a solid mixture may contain discernible phases of bulk material particles while a solid solution is homogeneously mixed at the molecular level and does not contain distinct phases of bulk material particles. This distinction is further defined by observing that a sectioned surface of a solid mixture composite exhibits microscopically large topographical features, whereas a sectioned surface of a molecular phase glass/polymer composite either appears smooth at the same microscopic magnification or requires substantially greater microscopic magnification to reveal topographical features at a molecular level.

The molecular phase glass/polymer composite material solid solution of the invention has a first solute of at least one glass with a second solute of at least one polymer wherein the first solute and the second solute are homogeneously dispersed at the molecular level. In addition, individual chains of the first solute are chemically bonded to the individual chains of the second solute.

While it may be that the first solute is taken from a particular glass, for example an oxide glass, it will be appreciated by those skilled in the art of glass/polymer composites that the invention is not so limited. The first solute may include other glasses singly or a combination thereof. Glasses may be selected from a group including but not limited to single component or multi-component oxides (for example phosphate, borate, silica, and silicate glasses), chalcogenides, halides, sulfates, and nitrates. Chalcogenides include but are not limited to sulfur and sulfur containing compounds.

A glass may be made from a network former or a combination of a network former and a network modifier. The type of glass selected depends upon the desired properties of the final product. However, all glasses have molecular networks that, when solubilized, break up into molecular units; for example, open or linear chains or closed chains or rings. In the present invention, linear chains may range in length of backbone from a minimum of about 10 repeat units. For desired physical properties of the glass/polymer composite material, it is preferred that the backbone chain have a length of at least 1,000 repeat units. The maximum number of repeat units depends upon the physical and chemical limitations of the type of glass. Chains having from 10,000 to 100,000 repeat units are practical and are demonstrated in the Examples in this specification. It will be appreciated that the invention is not limited to particular lengths of repeat units of a molecular chain of any particular glass.

Any one glass or combination of glasses may be selected depending upon the properties necessary or desired for a particular product or application.

As for glasses, so it is for polymers that one or a combination may be selected. However, it is preferred that the polymers have long molecular chains wherein the number of repeat units have a correspondence in length to the glass molecular chains. The length correspondence is a parameter that is selectable depending upon the desired properties of the final glass/polymer product, and includes but is not limited to the following two relationships. The correspondence can be a near equality of number of repeat units between glass and polymer molecular chains, or it can be that one chain length is a near integral fraction of the other chain length. Bonding between chains can be one-to-one, but is preferably a randomly intertwined three-dimensional network.

Examples of long chain polymers include but are not limited to organic and inorganic polymers. For this specification, organic polymers are defined as those polymers having only carbon atoms in the backbone chain. Other atoms and functional groups may be attached to the backbone chain. Inorganic polymers, therefore, are polymers having a backbone chain with an atom other than carbon included. Again, other atoms and functional groups may be attached to the backbone chain.

Examples of organic polymers include but are not limited to polyacrylic acid, polyvinyl alcohol, polyvinyl chloride, polyethylene oxide, polyvinyl pyrylidone, carbomethoxy cellulose, water soluble polymers for example polymethacrylic acid, polymeric starches and sugars, and polymers that are soluble in solvents other than water. Examples of inorganic polymers include but are not limited to phosphazenes, siloxanes, silanes, silazanes, and carbosilazenes. Any combination of glass(es) with any polymer(s) may be used as long as there is a solvent in which all constituents are dissolvable.

Molecular phase glass/polymer materials have heretofore been unavailable because there lacked methods for making them. A method of making a molecular phase glass/polymer composite has four basic steps: 1) selecting a solvent then forming a homogeneous mixture of at least one glass solute with at least one polymer solute, 2) removing the solvent and leaving a molecular mixture, then 3) heating the molecular mixture, and 4) producing a solid molecular phase glass/polymer composite.

The first step is selecting a polar solvent. Any polar solvent including but not limited to inorganic polar solvents and organic polar solvents may be used. Inorganic polar solvents include but are not limited to water, mineral acids, liquid ammonia, and thionyl chloride. Organic polar solvents include but are not limited to alcohols, ketones, aromatics, amines, ethers, sulfoxides, and caroxylic acid. The polar solvent selected must have the ability to dissolve both the glass and the polymer, or combination thereof desired for the final product. The preferred solvent is water. Table 1 shows preferred combinations of solvents, glass solutes, and polymer solutes.

TABLE 1

| PREFERRED SOLVENT/SOLUTE COMBINATIONS | | |
| --- | --- | --- |
| SOLVENT | GLASS SOLUTE | POLYMER SOLUTE |
| water | oxide glass(es) | water soluble polymer(s) |
| mineral acids | oxide glass(es) | water soluble polymer(s) |

The second step is forming a homogeneous mixture of a first solute having at least one glass with a second solute of at least one polymer. The homogeneous mixture is formed by causing to be present within the polar solvent and dissolving in the polar solvent, the first solute and second solute. The glass is caused to be present either by direct dissolution of a glass solid, or by dissolution of a glass precursor followed by hydrolyzing or other glass-forming step to convert the glass precursor to a glass. This mixing step is most preferably carried out under ambient temperature and pressure. However, temperatures and pressures other than ambient may be desirable to impart particular properties to the final product. The preferred operating temperature range is from about the solidification temperature of a component or mixture to about the boiling temperature of a component or mixture. The preferred operating pressure range is from about hard vacuum, as found in outer space, to about any achievable pressure.

The third step is removing the polar solvent. Once the homogeneous mixture is formed under ambient conditions, the long chains of the solutes begin to break into smaller chains. If left from about several hours to about a day, there will be so few long chains remaining, if any, that it is no longer possible to form a molecular glass/polymer composite. It may be that variation in temperature, pressure, or addition of a preservative may retard the breakdown of the long chains, but it is most preferred to proceed with solvent removal within a predetermined time that is as soon as practicable after forming the homogeneous mixture. It is preferred to begin removing solvent within from about several minutes to at most several hours after forming the homogeneous mixture. The amount of time that the homogeneous mixture remains in the solvent is selectable depending upon the desired properties of the final glass/polymer composite material. Where a precipitate is formed, solvent may be removed by pouring or decanting. Where a gel is formed, it is preferred to remove the solvent by evaporating the gel. In either case, removal of the solvent leaves a molecular mixture. When evaporation is used to remove solvent, it may be done by using a low pressure, elevated temperature, or mass transfer concentration differential between the homogeneous mixture and the ambient air. If elevated temperature is used at ambient or elevated pressure, the temperature may range from about 40° C. for six days to about 100° C. for a time less than or about 20 minutes.

The fourth step is heating the molecular mixture and forming bonds between chains of the first and second solutes, thereby producing a solid molecular phase glass/polymer composite wherein composite phases are individual molecules. This heating step may be separate and distinct from the heating used to remove the solvent distinguished by permitting the molecular mixture to cool for a time, or by changing the conditions (temperature and/or pressure) under which the fourth step heating proceeds. Alternatively, the fourth step heating may simply be a continuation in time of the conditions used to remove the solvent.

EXAMPLE 1

A first molecular phase glass/polymer composite was made according to the present invention wherein the first solute was an oxide glass of the silica type. The solute was obtained from the precursor tetraethylorthosilicate. The second solute was a polymer polybis(dimethylamino)-phosphazene, and the solvent was ethanol. Water was added as a reactant, and hydrofluoric acid was added as a catalyst to hydrolyze the precursor to a glass. The ratios by weight of the solutes, solvent, and other components were as follows: 1 part tetraethoxysilane, 4 parts ethanol, 4 parts water, 0.05 parts hydrofluoric acid, and 0.17 parts polybis(dimethylamino)-phosphazene. The ethanol was dried using magnesium ethoxide ($Mg(OCH_2CH_3)_2$). It is necessary to use a drying process to exclude excess or uncontrollable amounts of water.

Upon formation of a homogeneous mixture, a gel was formed. Removal of the solvent from the gel and formation of the solid molecular phase glass/polymer composite was by heating. The gel was heated to a temperature of 40° C. and kept at that temperature for 6 days. The final product was a solid molecular phase glass/phase composite. The process yielded 83% of the theoretical amount of molecular phase glass/polymer composite material.

EXAMPLE 2

A second molecular phase glass/polymer composite was made according to the present invention wherein the first solute was a glass sodium metaphosphate ($NaPO_3$), the second solute was a polymer polybis(dimethylamino)-phosphazene, and the solvent was water. The ratio by weight of the solutes was 1:1. The concentration of both solutes together in the solvent was 10% weight of solutes to volume of solvent (wt/vol).

The sodium metaphosphate was obtained from monosodium phosphate monohydrate by heating the monosodium phosphate monohydrate to a temperature of 800° C., then quenching it between two metal plates.

Removal of the solvent from the homogeneous solution and formation of the solid molecular phase glass/polymer composite was done in two stages. Solvent removal was done by heating the homogeneous solution for 20 minutes at 100° C. Solvent removal was followed by formation of the solid molecular phase by further heating at a temperature of 275° C. for 10 minutes. The amount of solid molecular phase glass/polymer composite was 100% of the theoretical yield.

While a particular ratio of constituents was used for this example, the ratio by weight of sodium metaphosphate solute to polybis(dimethylamino)-phosphazene solute may range from about 1:1 to about 7:1. The amount of the two solutes in proportion to the amount of water solvent may range from a weight ratio that is so small as to be below detectable limits to about 28%, above which there is insufficient solvent to dissolve the solutes. It is preferred that the lower limit be about 10% since lower concentrations require more heating to remove the water solvent.

EXAMPLE 3

A third molecular phase glass/polymer composite was made according to the present invention wherein the first solute was a glass metaphosphate glass ($NaLiK(PO_3)_3$, the second solute was a polymer polybis(dimethylamino)-phosphazene, and the solvent was water. The ratio by weight of the solutes was 1:1. The amount of both solutes in the solvent was 10%(wt/vol).

The metaphosphate glass was obtained by mixing equal molar amounts of sodium, lithium, and potassium dihydrogen phosphates, then heating the mixture to a temperature of 800° C. then quenching it between two metal plates.

Removal of the solvent from the homogeneous solution and formation of the solid molecular phase glass/polymer composite was by heating. The homogeneous solution was heated to a temperature of 100° C. for 20 minutes, resulting in a molecular mixture. The amount of molecular mixture was 100% of the theoretical yield. Further heating to 275° C. for 10 minutes yielded a solid molecular phase glass/phase composite.

EXAMPLE 4

A fourth molecular phase glass/polymer composite was made according to the present invention wherein the first solute was a glass metaphosphate glass $NaLiK(PO_3)_3$, the second and third solutes were a polymer polybis(dimethylamino)-phosphazene and $ZnCl_2.H_2O$, and the solvent was water. The ratio by weight of the solutes was 1:1:1.5, respectively. The concentration of the three solutes in the solvent was 10%(wt/vol).

The metaphosphate glass was obtained by mixing equal molar amounts of sodium, lithium, and potassium dihydrogen phosphates, then heating the mixture to a temperature of 800° C., then subsequently quenching it between two metal plates.

Removal of the solvent from the homogeneous solution and formation of the solid molecular phase glass/polymer composite was by heating. The homogeneous solution was heated to a temperature of 100° C. for 20 minutes, resulting in a molecular mixture. The amount of molecular mixture was 100% of the theoretical yield. Further heating to 275° C. for 10 minutes yielded a solid molecular phase glass/phase composite.

While the amount of zinc chloride was 1.5 times by molar amount the amount of either of the metaphosphate glass in this experiment, the molar amount of zinc chloride may range from about 0.5 to 1.5.

EXAMPLE 5

A fifth molecular phase glass/polymer composite was made according to the present invention wherein the first solute was a metaphosphate glass having a chemical formula of $NaKLi(PO_3)_3(1.5(ZnCl_2.H_2O))$, the second solute was a polymer polybis(dimethylamino)-phosphazene, and the solvent was water. The ratio by weight of the solutes was 1:1. The concentration of both solutes in the solvent was 10%(wt/vol).

The zinc containing metaphosphate glass was similar to Example 5 except that in Example 5 the $ZnCl_2.H_2O$ was a separate solute whereas in this experiment the $ZnCl_2.H_2O$ added to the monobasic alkaliphosphates thereby forming a part of the metaphosphate glass solute. The metaphosphate glass was obtained by mixing equal molar amounts of sodium phosphate, lithium phosphate, and potassium phosphate with a 1.5 molar equivalent of $ZnCl_2.H_2O$, then heating the mixture to a temperature of 800° C. and quenching it between two metal plates.

Removal of the solvent from the homogeneous solution and formation of the solid molecular phase glass/polymer composite was by heating. The homogeneous solution was heated to a temperature of 100° C. for 20 minutes, resulting in a molecular mixture. The amount of molecular mixture was 100% of the theoretical yield. Further heating to 275° C. for 10 minutes yielded a solid molecular phase glass/phase composite.

While the amount of zinc chloride was 1.5 times by molar amount the amount of either of the other solutes in this experiment, the molar amount of zinc chloride may range from about 0.5 to 1.5.

Alternate Embodiments

The experiments described herein were carried out on a small scale in a laboratory. It will be apparent, however, to those skilled in the art that the molecular phase glass/polymer materials have many uses and the methods of making them including but not limited to spin casting, dip coating, and fiber pulling.

Spin casting or dip coating is used for film deposition on a substrate. For spin or dip coating, it is required that the amount of solutes in solution is between about 2% to 20%(wt/vol) and is preferably from about 2%(wt/vol) to about 5%(wt/vol). The homogeneous mixture of the present invention is deposited onto the substrate to be coated by dipping, then heated to form a solid molecular phase glass/polymer composite coating. Alternatively, the coated substrate may be spun from about 2000 rpm to about 5000 rpm for a time of from about 1 minute to about 2 minutes.

Fiber pulling is done using homogeneous mixtures having from about 10%(wt/vol) to about 50%(wt/vol) of solutes in solution. The pulled fiber is then heated to drive off solvent and produce a solid molecular phase glass/polymer composite fiber.

While several preferred embodiments of the present invention have been shown and described, and several examples have been presented, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of making a glass/polymer composite, comprising the steps of:
   (a) selecting a polar solvent;
   (b) dissolving a solid glass capable of being dissolved within the polar solvent, and causing to be present within the polar solvent at least one second solute that is a polymer, thereby forming a homogeneous mixture of said solutes;
   (c) removing said polar solvent within a predetermined time from formation of the homogeneous mixture and leaving a molecular mixture; and
   (d) heating the molecular mixture, thereby producing a solid glass/polymer composite wherein composite phases are individual molecules.

2. A method as recited in claim 1, wherein the polar solvent is organic or inorganic.

3. A method as recited in claim 2, wherein the inorganic polar solvent is selected from the group consisting of water, mineral acids, ammonia, and thionyl chloride.

4. A method as recited in claim 1, wherein the polar organic solvent is non-aqueous.

5. A method as recited in claim 4, wherein the non-aqueous polar organic solvent is selected from the group consisting of alcohols, alkanes, aromatics, amines, ethers, and carboxylic acid.

6. A method as recited in claim 1, wherein the polymer is caused to be present by dissolving a polymer in the polar solvent.

7. A method as recited in claim 1, wherein removing the polar solvent is by heating and evaporation.

8. A method as recited in claim 7, wherein the molecular mixture is heated to a boiling point of the polar solvent.

9. A method as recited in claim 1, wherein the glass contains a network former.

10. A method as recited in claim 9, wherein the glass is selected from the group consisting of oxide glasses, chalcogenide glasses, halide glasses, sulfate glasses and nitrate glasses.

11. A method as recited in claim 1, wherein the polymer is organic or inorganic.

12. A method as recited in claim 11, wherein the organic polymer is selected from the group consisting of polyacrylic acid, polyvinyl alcohol, polyvinyl chloride, water soluble polymers, polymethacrylic acid, polymeric starches and sugars, and polymers that are soluble in solvents other than water.

13. The method as recited in claim 1, wherein chemical bonds are formed between at least the dissolved solid glass and the second solute.

14. A method as recited in claim 11, wherein the inorganic polymer is selected from the group consisting of phosphazenes, siloxanes, silanes, silazanes, and carbosilazenes.

* * * * *